United States Patent
Connor et al.

(10) Patent No.: US 7,415,513 B2
(45) Date of Patent: Aug. 19, 2008

(54) METHOD, APPARATUS, SYSTEM, AND ARTICLE OF MANUFACTURE FOR GENERATING A RESPONSE IN AN OFFLOAD ADAPTER

(75) Inventors: Patrick L. Connor, Portland, OR (US); Mark V. Montecalvo, Hillsboro, OR (US); Scott P. Dubal, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 863 days.

(21) Appl. No.: 10/741,031

(22) Filed: Dec. 19, 2003

(65) Prior Publication Data

US 2005/0138114 A1   Jun. 23, 2005

(51) Int. Cl.
*G06F 15/177* (2006.01)

(52) U.S. Cl. .................. 709/220; 709/203; 726/22

(58) Field of Classification Search .............. 709/220, 709/203; 726/22
See application file for complete search history.

(56) References Cited

U.S. PATENT DOCUMENTS 5,937,169 A * 8/1999 Connery et al. ............ 709/250
7,231,665 B1 * 6/2007 McArdle et al. ............ 726/22
2003/0196123 A1 * 10/2003 Rowland et al. ........... 713/201
2004/0037319 A1 * 2/2004 Pandya ...................... 370/469

OTHER PUBLICATIONS

J. Postel, ed. "Transmission Control Protocol DARPA Internet Program Protocol Specification," Information Sciences Institute, Sep. 1981; 88 pp.

* cited by examiner

*Primary Examiner*—Nathan Flynn
*Assistant Examiner*—Kyung H Shin
(74) *Attorney, Agent, or Firm*—Konrad Raynes & Victor LLP; Rabinoranath Dutta (57) ABSTRACT

Provided are a method, apparatus, system, and article of manufacture, wherein in certain embodiments a network adapter having an offload protocol stack receives a query. The offload protocol stack of the network adapter is configured to provide a programmable identity for the offload protocol stack of the network adapter. A response is generated to the query by processing the query in the configured offload protocol stack, wherein the response is based on the programmable identity. The generated response is sent by the network adapter.

19 Claims, 7 Drawing Sheets

FIG. 10

# METHOD, APPARATUS, SYSTEM, AND ARTICLE OF MANUFACTURE FOR GENERATING A RESPONSE IN AN OFFLOAD ADAPTER

BACKGROUND

1. Field

The disclosure relates to a method, apparatus, system, and article of manufacture for generating a response in an offload adapter.

2. Background

A network adapter may be coupled to a host system to provide communications. Some network adapters may provide hardware support for the processing of data related to the Transmission Control Protocol/Internet Protocol (TCP/IP) or other protocols that may be used for communications. Such network adapters may be referred to as offload adapters, and if the provided hardware support is for the TCP/IP protocol then the offload adapter may be referred to as a TCP/IP offload engine (TOE) adapter. Further details of the TCP/IP protocol are described in the publication entitled "Transmission Control Protocol: DARPA Internet Program Protocol Specification," prepared for the Defense Advanced Projects Research Agency (RFC 793, published September 1981). TOE adapters may perform all or major parts of the TCP/IP protocol processing, including processing send requests, i.e., requests to send packets from a host system to a computational device.

A protocol stack may be implemented in the TOE adapter, wherein some of the functions of protocol processing may be offloaded from a host system to the protocol stack, and wherein the TOE adapter is coupled to the host system and provides communications for the host system. The protocol stack for the TOE adapter may be implemented in hardware, software, firmware, microcode or any combination thereof.

Certain applications may be used for network exploration or security auditing. Such applications may transmit raw packets and attempt to determine what hosts are available in a network, what services the hosts provide, what versions of operating systems the hosts run, what type of packet filters or firewalls are in use in the hosts, and other characteristics associated with the hosts and the network. Certain applications perform such network exploration or security auditing for exploiting vulnerabilities in the hosts and the network.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments provide an offload adapter with a programmable identity, where the programmable identity prevents an offload protocol stack of the offload adapter from being identified correctly. Without a correct identification of the offload protocol stack, vulnerabilities in the offload adapter may be relatively more difficult to exploit when compared to situations where the offload protocol stack can be identified correctly.

Figure 1:
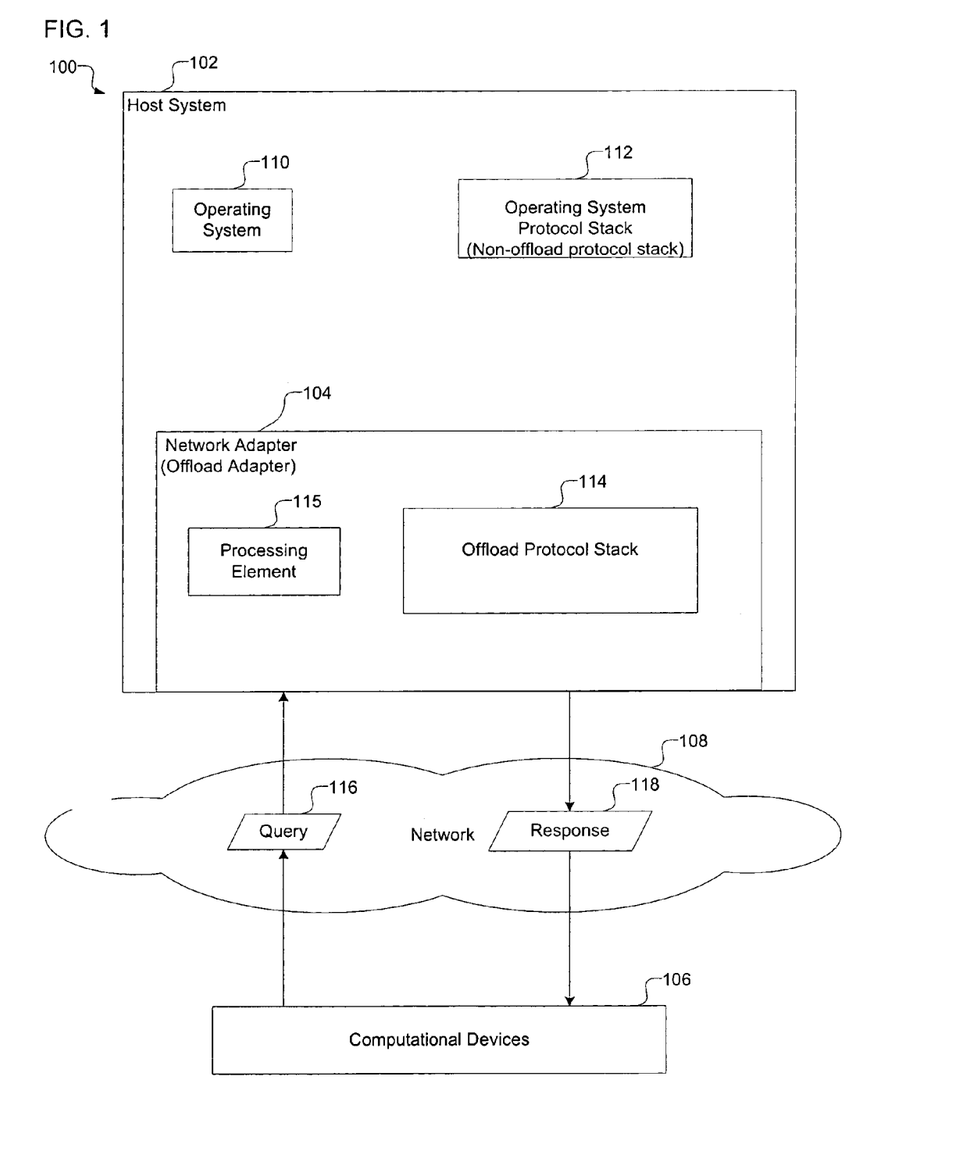
FIG. 1 illustrates a first computing environment, in accordance with certain embodiments.

FIG. 1 illustrates a first computing environment 100 in which certain embodiments are implemented. A host system 102 to which a network adapter 104 is coupled may be capable of communicating with one or more computational devices 106 over a network 108. The host system 102 sends and receives packets over the network 108 via the network adapter 104 that is coupled to the host system 102. The packets may be for communication between the host system 102 and one or more of the computational devices 106.

The host system 102 may be a computational platform, such as a personal computer, a workstation, a server, a mainframe, a hand held computer, a palm top computer, a laptop computer, a telephony device, a network computer, a blade computer, etc. The computational devices 106 may include various types of computers, routers, storage devices, etc., that are capable of sending and receiving communications with respect to the host system 102. The network 108 may be any network, such as the Internet, an intranet, a Local area network (LAN), a Storage area network (SAN), a Wide area network (WAN), a wireless network, etc. Also the network 108 may be part of one or more larger networks or may be an independent network or may be comprised of multiple interconnected networks. In certain embodiments, the network 108 may be implemented with high speed transmission technologies.

The host system 102 may comprise an operating system 110 and an operating system protocol stack 112. The operating system 110 may include certain versions of the Microsoft Windows* Operating System, such as Windows 2000*, Windows XP*, etc. Other operating systems, such as, versions of the UNIX* operating system may also be used in certain embodiments. The operating system protocol stack 112 is implemented by the operating system 110 and the operating system protocol stack 112 is capable of protocol processing. Protocol processing may include the processing of instructions related to a protocol, including the TCP/IP protocol and other protocols.

The network adapter 104 may include hardware, microcode, firmware, and/or software support for processing at least some commands related to at least one protocol, such as, the TCP/IP protocol. For example, the network adapter 104 may include a TCP offload engine adapter or other logic capable of causing communications. The network adapter 104 may be referred to as an offload adapter. While in the computing environment 100 the network adapter 104 is shown internal to the host system 102, in alternative embodiments the network adapter 104 may be external to the host system 102. The network adapter 104 is capable of interfacing with the host system 102 and handle communications for the host system 102. While a single network adapter 104 is shown coupled to the host system 102, in certain alternative embodiments a plurality of network adapters may be coupled to the host system 102. In certain embodiments the network adapter 100 is an offload adapter, and the network adapter 104 may offload protocol processing from the host system 102.

The network adapter 104 includes an offload protocol stack 114 that processes commands related to a communications protocol, and a processing element 115 that may be a processor capable of executing operations. The offload protocol stack 114 may be implemented in hardware, microcode, firmware, and/or software in the network adapter 104. In certain embodiments, the offload protocol stack 114 may be implemented as an Application Specific Integrated Circuit (ASIC) in hardware as part of the network adapter 104. The offload protocol stack 114 is capable of protocol processing. In certain embodiments, the offload protocol stack 114 is capable of speeding up protocol processing by processing packets in the offload protocol stack 114, when compared to processing the packets in the operating system protocol stack 112 that is implemented in the host system 102.

The computational device 106 may send a query 116 to the host system 102 over the network 108. The host system 102 may receive the query 116 and after protocol processing the query may generate a response 118 for the computational device 106. In certain embodiments, the response 118 may represent a null response, i.e., the response 118 may represent the lack of a reply to the query 116. Therefore, in certain embodiments the response 118 is an explicit response and in certain embodiments the response 118 is an implicit response.

In certain embodiments, the query 116 sent to the host system 102 may be a query that is part of a cyber attack directed at exploiting vulnerabilities of the host system 102, the network adapter 104, and the network 108. The cyber attack may be related to system modification, invasion of privacy, denial of service, antagonism towards the computing environment 100, etc.

The query 116 may be designed to be used against a specific protocol stack with a known exploitable error. In certain embodiments the query may be explicit and in certain embodiments the query may be implicit. Various TCP based protocol stacks that have been deployed include Tahoe, Reno, NewReno, Fack, Vegas, etc., as well as TCP based protocol stacks associated with various releases of Microsoft Windows and UNIX-based operating systems. Cyber attack applications may use incongruities and delay variations in any protocol stack to fingerprint the stack version or operating system. Cyber attack tools may exploit minor differences in the uncommon code paths to determine the protocol stack. The expected behavior of a protocol stack in normal use is generally documented in the specification of the protocol stack. The behaviors of a protocol stack for dealing with error cases, such as malformed Internet Control Message Protocol (ICMP) packets, may be implemented less consistently. Certain applications, such as, Nmap, may ascertain differences in operating system and protocol stacks by sending the query 116. If the protocol stack is identified correctly, then there are attack tools that can be used against a given protocol stack. In certain embodiments, the query 116 may be designed in accordance with any technique that may be used for cyber attacks, including the techniques described above. There is no requirement that the query 116 be an explicit query. In certain embodiments, the query 116 may represent indirect inquiries.

FIG. 1 describes certain embodiments in which a correct identification of the offload protocol stack 114 may not be possible from the response 118 generated by the network adapter 104 in response to the query 116.

Figure 2:
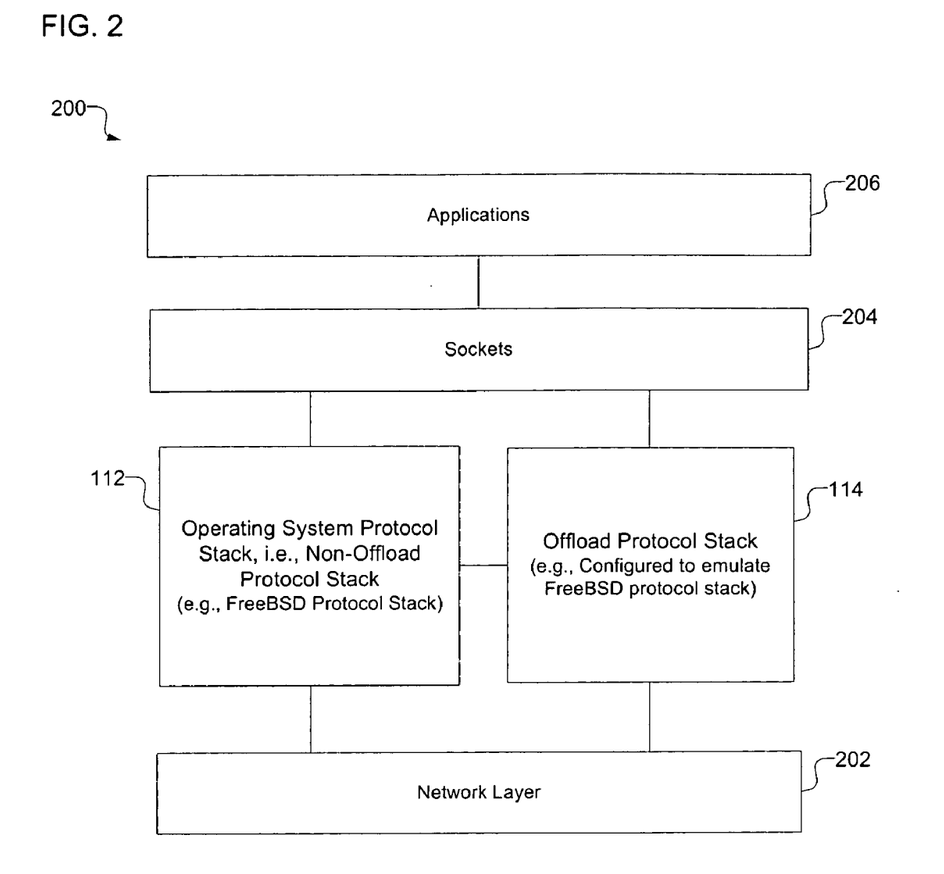
FIG. 2 illustrates a block diagram of an operating system protocol stack and an offload protocol stack, in accordance with certain embodiments.

FIG. 2 illustrates a block diagram of an exemplary execution environment 200 of the operating system protocol stack 112 and an offload protocol stack 114, in accordance with certain embodiments.

In certain embodiments, the offload protocol stack 114 of the network adapter 104 can appear to emulate the native operating system protocol stack 112 of the operating system 110 or to emulate other protocol stacks. In certain embodiments the change in emulation by the offload protocol stack 114 may be in response to an attack that attempts to exploit vulnerabilities of an existing emulation by the offload protocol stack 114 in the network adapter 104. The emulations may be driver programmable or included in the network adapter 104. For example, a plurality of identity profiles, wherein an identity profile corresponds to a particular emulation of a protocol stack by the offload protocol stack 114 may be included in the network adapter 104. In certain embodiments, the offload protocol stack 114 may be capable of emulating protocol stacks corresponding to Windows Longhorn, FreeBSD, Linux* 2.7, etc.

FIG. 2 illustrates that the operating system protocol stack 112 is a non-offload protocol stack, and in certain embodiments may correspond to the FreeBSD protocol stack. In certain embodiments the offload protocol stack 114 may be configured to emulate the FreeBSD protocol stack that is the operating system protocol stack 112. In certain other embodiments, the offload protocol stack 114 may be configured to emulate a plurality of protocol stacks to provide a plurality of programmable identities to the offload protocol stack 114.

The exemplary execution environment 200 comprises a network layer 202 over which the operating system protocol stack 112 and the offload protocol stack 114 may execute. Sockets 204 and applications 206 that execute over the sockets 204, may execute over the operating system protocol stack 112 and the offload protocol stack 114.

FIG. 2 illustrates certain embodiments in which the offload protocol stack 114 can emulate one or more protocol stacks to provide a programmable identity to the offload protocol stack 114 of the network adapter 104.

Figure 3:
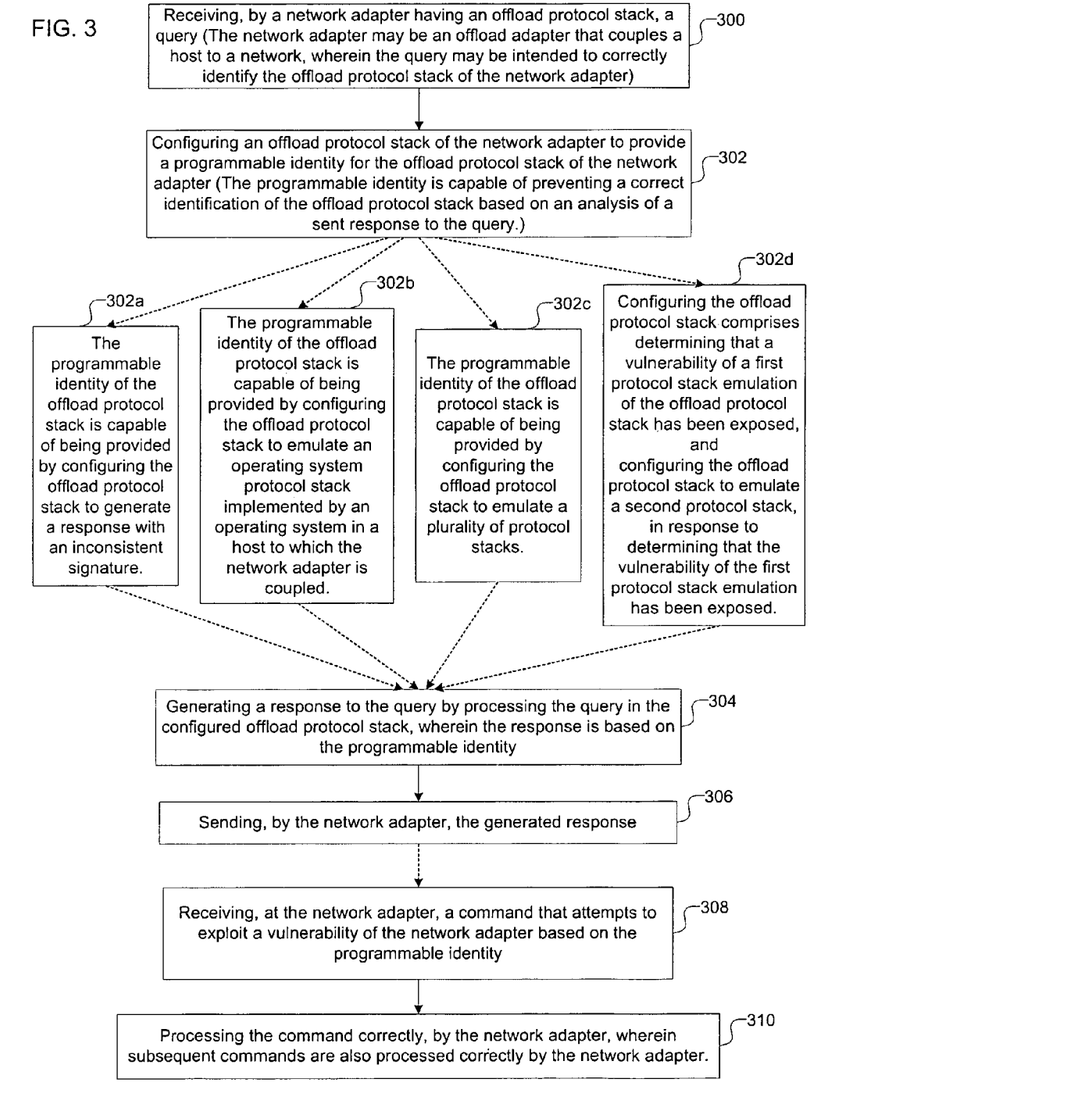
FIG. 3 illustrates operations implemented in a network adapter of the first computing environment of FIG. 1.

FIG. 3 illustrates operations implemented in the network adapter 104 of the first computing environment of FIG. 1.

Control starts at block 300, where the network adapter 104 having the offload protocol stack 114, receives the query 116. In certain embodiments, the network adapter 104 may be an offload adapter that couples the host 102 to the network 108, and wherein the query 116 may be intended to correctly identify the offload protocol stack 114 of the network adapter 104.

The network adapter 104 configures (at block 302) the offload protocol stack 114 to provide a programmable identity for the offload protocol stack 114. In certain embodiments, the programmable identity is capable of preventing a correct identification of the offload protocol stack 114 based on an analysis of a response to the query 116. Configuring the offload protocol stack 114 can be performed differently in different embodiments. Blocks 302a, 302b, 302c, and 302d show different ways of configuring the offload protocol stack 114. In certain embodiments, the configuration of the offload protocol stack 114 may be performed by executing operations in the processing element 115 of the network adapter, where the processing element 115 may be coupled to the offload protocol stack 114.

The programmable identity of the offload protocol stack 114 is capable of being provided by configuring (at block 302a) the offload protocol stack 114 to generate a response with an inconsistent signature. For example, the network adapter 114 may randomly choose among several alternative code paths to respond to the same query 116 and cause the response 118 to have different fingerprints. While the response 118 is still a valid response to the query 116 as per the protocol stack, since the response 118 may be different for different queries the sender of the query may be prevented from determining the true identity of the offload protocol stack 114.

The programmable identity of the offload protocol stack 114 is also capable of being provided by configuring (at block 302b) the offload protocol stack 114 to emulate the operating system protocol stack 112 implemented by the operating system 110 in the host system 102 to which the network adapter 104 is coupled. In such a case, although the response 118 may have the same apparent fingerprint as the operating system protocol stack 112, the offload protocol stack 114 may not be vulnerable in situations where the operating system protocol stack 112 is vulnerable, because the offload protocol stack 114 may execute code that is different from the code of the operating system protocol stack 112.

The programmable identity of the offload protocol stack 114 is also capable of being provided by configuring (at block 302c) the offload protocol stack 114 to emulate a plurality of protocol stacks. The network adapter 104 may configure the offload protocol stack 114 to emulate randomly one of the plurality of protocol stacks. The response 108 to the query 116 may not reveal the true identity of the offload protocol stack 114.

In certain embodiments configuring the offload protocol stack 114 comprises determining that a vulnerability of a first protocol stack emulation of the offload protocol stack has been exposed, and configuring the offload protocol stack to emulate a second protocol stack, in response to determining that the vulnerability of the first protocol stack emulation has been exposed (at block 302d). In such a case, the network adapter 104 may automatically reconfigure the offload protocol stack 114 to emulate a protocol stack that is likely to be immune to cyber attacks. For example, if the offload protocol stack 114 is emulating a FreeBSD protocol stack and the FreeBSD protocol stack is under cyber attack, then the offload protocol stack 114 may be reconfigured to emulate some other protocol stack.

Once the offload protocol stack has been configured (blocks 302, 320a, 302b, 302c, 302d) control proceeds to block 304, where the network adapter 104 generates the response 118 to the query 116 by processing the query 116 in the configured offload protocol stack 114, wherein the response 118 is based on the programmable identity.

The network adapter 104 sends (at block 306) the generated response 118. At a later time, the network adapter 104 may receive (at block 308) a command that attempts to exploit a vulnerability of the network adapter 104 based on the programmable identity. The true identity of the offload protocol stack 114 is different from the programmable identity whose vulnerability the command attempts to exploit. Therefore, the network adapter 104 processes (at block 310) the command correctly, wherein subsequent commands are also processed correctly by the network adapter 104.

FIG. 3 illustrates certain embodiments in which the network adapter 104 allows the offload protocol stack 114 to assume different programmable identities and prevents exploitation of vulnerabilities associated with the offload protocol stack 114.

Figure 4:
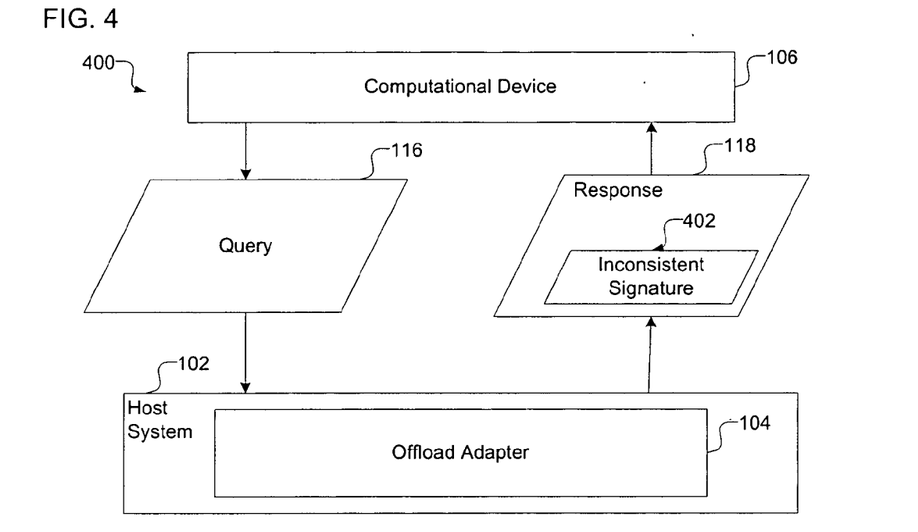
FIG. 4 illustrates a second computing environment, in accordance with certain embodiments.

FIG. 4 illustrates a second computing environment 400, in accordance with certain exemplary embodiments. In the second computing environment 400, the response 118 from the offload adapter 104 has an inconsistent signature 402.

Figure 5:
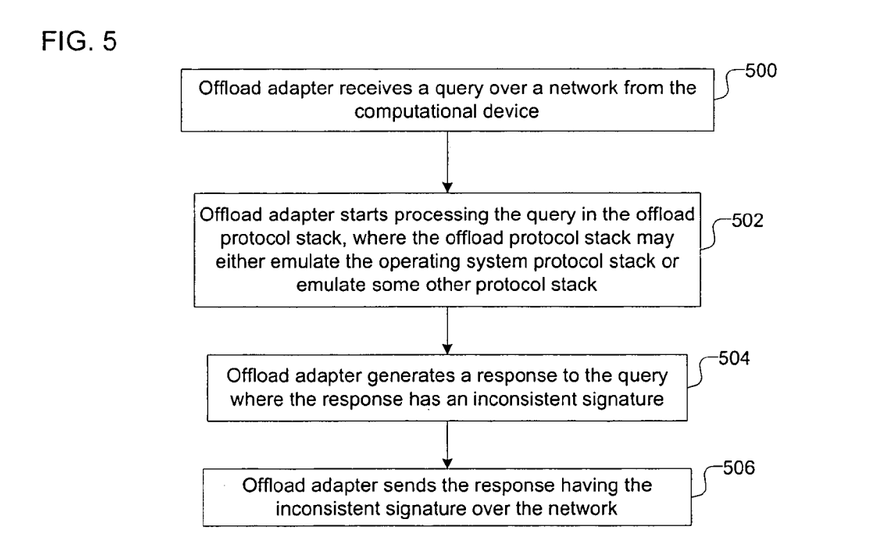
FIG. 5 illustrates operations implemented in a network adapter of the second computing environment of FIG. 4.

FIG. 5 illustrates operations implemented in the offload adapter 104 of the second computing environment 400 of FIG. 4, in accordance with certain exemplary embodiments.

Control starts at block 500, where the offload adapter 104 receives a query 116 over the network 108 from the computational device 106. The offload adapter 104 starts processing (block 502) the query 116 in the offload protocol stack 114, where the offload protocol stack 114 may either emulate the operating system protocol stack 112 or some other protocol stack. The offload adapter 104 generates (at block 504) a response 118 to the query 116, where the response 118 has an inconsistent signature 402. The offload adapter 104 sends (at block 504) the response 118 having the inconstant signature 402 over the network 108. As a result of the inconstant signature 402, the computational device 106 is prevented from analyzing the response 118 to identify which protocol stack the offload protocol stack 114 is emulating.

Figure 6:
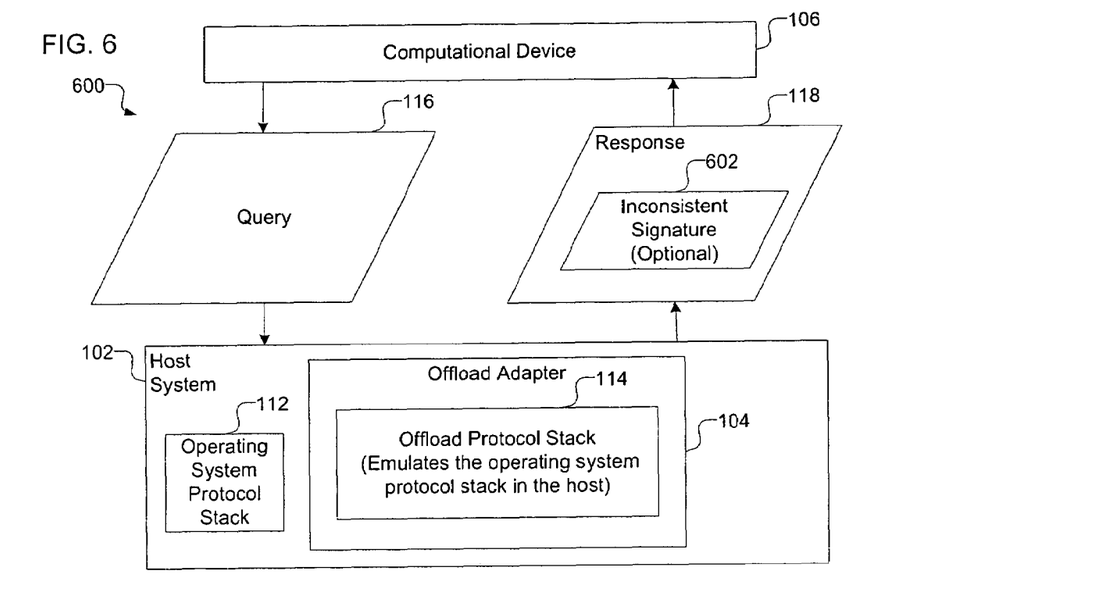
FIG. 6 illustrates a third computing environment, in accordance with certain embodiments.

FIG. 6 illustrates a third computing environment 600, in accordance with certain exemplary embodiments. In the third computing environment 600, the offload protocol stack 114 emulates the operating system protocol stack 112 of the host system 102, and in certain embodiments the response 118 from the offload adapter 104 may also have an inconsistent signature 602.

Figure 7:
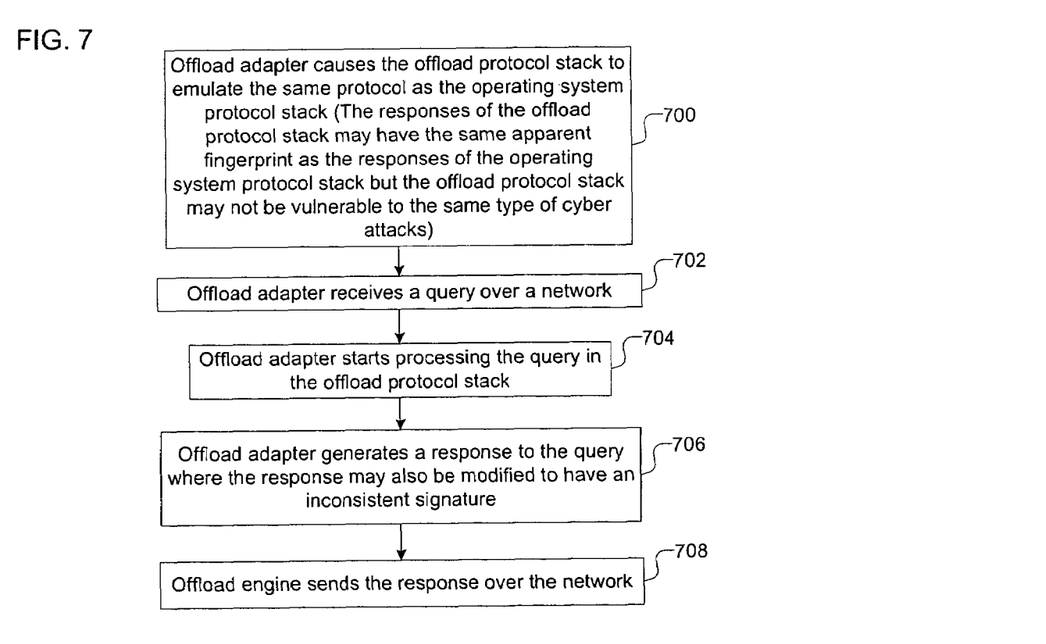
FIG. 7 illustrates operations implemented in a network adapter of the third computing environment of FIG. 6.

FIG. 7 illustrates operations implemented in the offload adapter 104 of the third computing environment 600 of FIG. 6, in accordance with certain exemplary embodiments.

Control starts at block 700, where the offload adapter 104 causes the offload protocol stack 114 to emulate the same protocol as the operating system protocol stack 112. The responses of the offload protocol stack 114 may have the same apparent fingerprint as corresponding responses of the operating system protocol stack 112 but the offload protocol stack 114 may not be vulnerable to the same type of cyber attacks.

The offload adapter 104 receives (at block 702) a query 116 over the network 108 from the computational device 106. The offload adapter 104 starts processing (at block 704) the query 116 in the offload protocol stack 114, where the offload protocol stack 114 is emulating the operating system protocol stack 112. The offload adapter 104 generates (at block 706) a response 118 to the query 116, where the response 118 may in certain embodiments also be modified to have the inconsistent signature 602. The offload adapter 104 sends (at block 708) the response 118 having the inconstant signature 602 over the network 108. The computational device 106 may be prevented from analyzing the response 118 to expose vulnerabilities in the offload protocol stack 114.

Figure 8:
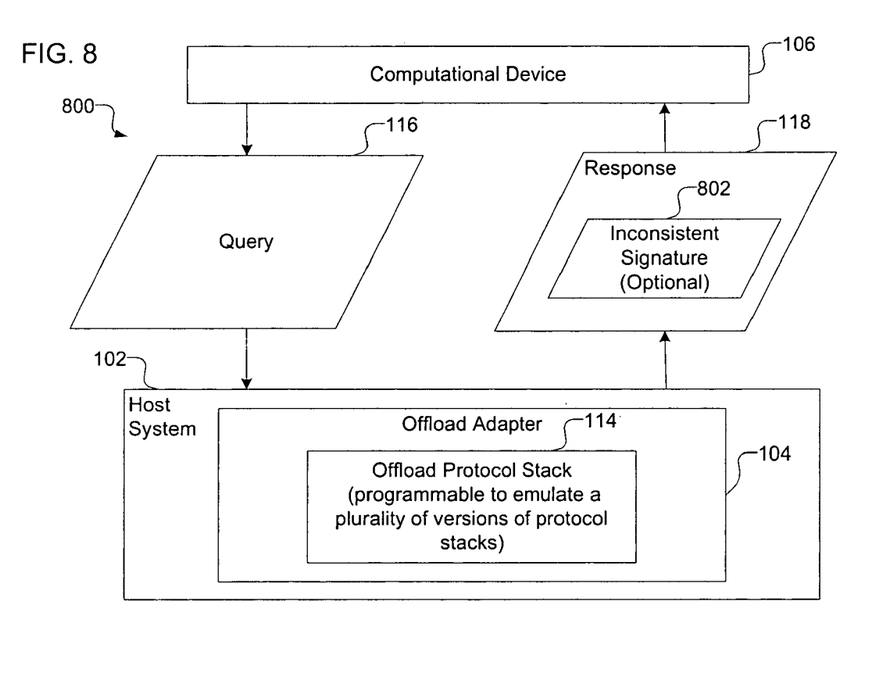
FIG. 8 illustrates a fourth computing environment, in accordance with certain embodiments.

FIG. 8 illustrates a fourth computing environment 700, in accordance with certain exemplary embodiments. In the fourth computing environment 700, the offload protocol stack 114 is programmable to emulate a plurality of versions of protocol stacks, and in certain embodiments the response 118 from the offload adapter 104 may also have an inconsistent signature 802.

Figure 9:
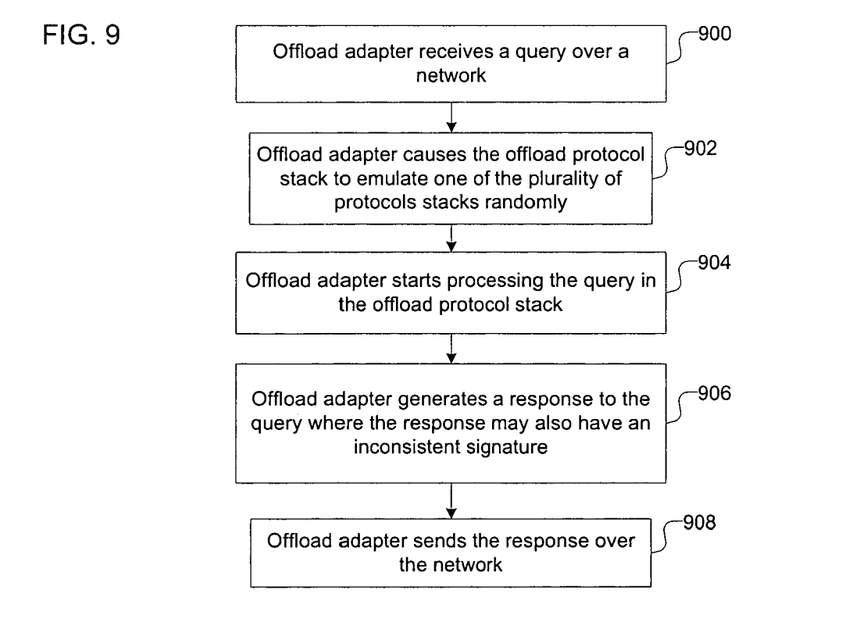
FIG. 9 illustrates operations implemented in a network adapter of the fourth computing environment of FIG. 8.

FIG. 9 illustrates operations implemented in the offload adapter 104 of the fourth computing environment 800 of FIG. 8, in accordance with certain exemplary embodiments.

Control starts at block 900, where the offload adapter receives a query 116 over the network 108 from the computational device 106. The offload adapter 104 causes (at block 902) the offload protocol stack 114 to emulate one of the plurality of protocol stacks randomly. The offload adapter 104 starts (at block 904) processing the query in the offload protocol stack 114. The offload adapter 104 generates (at block 906) a response 118, where the response 118 may in certain embodiments also be modified to have the inconsistent signature 802. The offload adapter 104 sends (at block 908) the response 118 having the inconstant signature 802 over the network 108. The computational device 106 may be prevented from analyzing the response 118 to expose vulnerabilities in the offload protocol stack 114 as the offload protocol stack 114 may randomly emulate one of a plurality of protocol stacks.

The embodiments limit the successful execution of cyber attacks against the network adapter 104. When a software protocol stack, such as, the operating system protocol stack 112, is exploited in a cyber attack, the vendor of the operating system 110 can release a patch to secure the operating system protocol stack 112. Installing the patch can be via an automatic update from the Windows update feature in the Microsoft Windows operating system. For network adapter 114, where the offload protocol stack 114 may comprise of dedicated logic implemented in hardware, firmware, microcode or any combination thereof, updates to the offload protocol stack 114 may be relatively more difficult than updates to the software based operating system protocol stack 112 associated with the operating system 110. In certain embodiments, the offload protocol stack 114 is prevented from being correctly identified and successful execution of cyber attacks against the network adapter 104 is restricted. Certain embodiments prevent cyber attacks from being specifically targeted at the network adapter 104.

The described techniques may be implemented as a method, apparatus or article of manufacture involving software, firmware, micro-code, hardware and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed.

Figure 10:
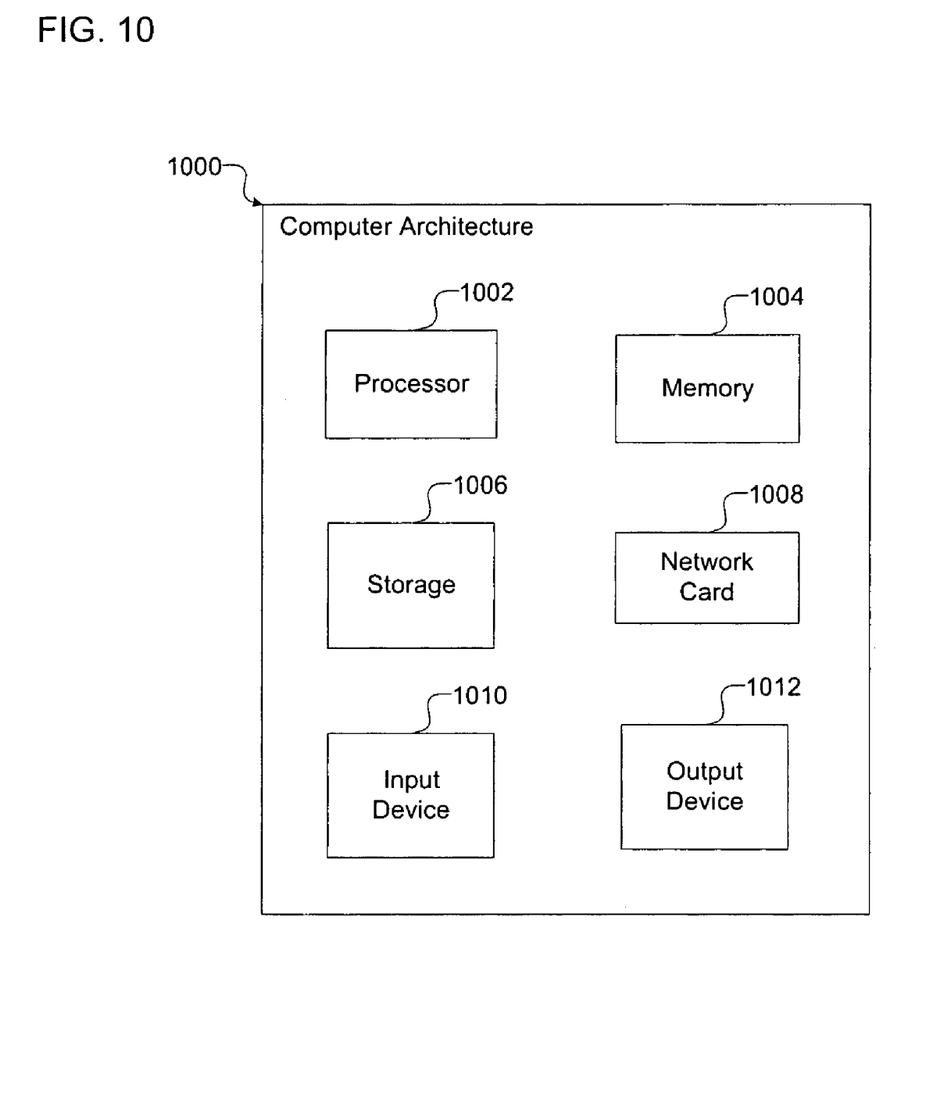
FIG. 10 illustrates a block diagram of a computer architecture for certain elements of the first, second, third, and fourth computer environments, in accordance with certain embodiments.

FIG. 10 illustrates a block diagram of a computer architecture in which certain embodiments are implemented. FIG. 10 illustrates one embodiment of the host system 102, the computational devices 106, and the network adapter 104. The host system 102, the computational devices 106, and the network adapter may implement a computer architecture 1000 having a processor 1002, a memory 1004 (e.g., a volatile memory device), and storage 1006. Not all elements of the computer architecture 1000 may be found in the host system 102, the computational devices 106, and the network adapter 104. The storage 606 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1006 may comprise an internal storage device, an attached storage device and/or a network accessible storage device. Programs in the storage 1006 may be loaded into the memory 1004 and executed by the processor 1002 in a manner known in the art. The architecture may further include a network card 1008 to enable communication with a network. The architecture may also include at least one input device 1010, such as a keyboard, a touchscreen, a pen, voice-activated input, etc., and at least one output device 1012, such as a display device, a speaker, a printer, etc.

In certain embodiments the network adapter 104 may be included in a computer system including any storage controller, such as, a Small Computer System Interface (SCSI), AT Attachment Interface (ATA), Redundant Array of Independent Disk (RAID), etc., controller, that manages access to a non-volatile storage device, such as a magnetic disk drive, tape media, optical disk, etc. In alternative embodiments, the network adapter 104 may be included in a system that does not include a storage controller, such as certain hubs and switches.

Certain embodiments may be implemented in a computer system including a video controller to render information to display on a monitor coupled to the computer system including the network adapter 104, where the computer system may comprise a desktop, workstation, server, mainframe, laptop, handheld computer, etc. An operating system may be capable of execution by the computer system, and the video controller may render graphics output via interactions with the operating system. Alternatively, some embodiments may be implemented in a computer system that does not include a video controller, such as a switch, router, etc. Furthermore, in certain embodiments the device may be included in a card coupled to a computer system or on a motherboard of a computer system.

At least certain of the operations of FIGS. 3, 5, 7 and 9 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components. In certain embodiments the network adapter may be a specialized part of the central processing unit of the computational platform.

The data structures and components shown or referred to in FIGS. 1-10 are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

\* Microsoft Windows, Windows 2000, Windows XP are trademarks of Microsoft Corp.
\* UNIX is a trademark of the Open Group.
\* Linux is a trademark of Linus Torvalds.

What is claimed is:

1. A method, comprising:
receiving, by a network adapter having an offload protocol stack, a query;
configuring the offload protocol stack of the network adapter to provide a programmable identity for the offload protocol stack of the network adapter, by:
(i) determining that a vulnerability of a first protocol stack emulation of the offload protocol stack has been exposed; and
(ii) configuring the offload protocol stack to emulate a second protocol stack, in response to determining that the vulnerability of the first protocol stack emulation has been exposed;
generating a response to the query by processing the query in the configured offload protocol stack, wherein the response is based on the programmable identity, wherein the programmable identity of the offload protocol stack is capable of being provided by configuring the offload protocol stack to generate the response with an inconsistent signature, and wherein the response is generated with the inconsistent signature by randomly choosing among a plurality of alternative code paths to respond to the query; and
sending, by the network adapter, the generated response, wherein the programmable identity prevents a correct identification of the offload protocol stack based on an analysis of the sent response to the query.

2. The method of claim 1, wherein the programmable identity of the network adapter is capable of being provided by configuring the offload protocol stack to emulate a plurality of protocol stacks, wherein those protocol stacks that are under cyber attack are less preferred for emulation by the offload protocol stack in comparison to those protocol stacks that are likely to be immune to cyber attacks.

3. The method of claim 2, wherein the programmable identity of the network adapter is capable of being provided by configuring the offload protocol stack to emulate an operating system protocol stack implemented by an operating system in a host to which the network adapter is coupled, wherein the offload protocol stack avoids being vulnerable in situations in which the operating system protocol stack is vulnerable because the offload protocol stock executes code that is different from code executed by the operating system protocol stack.

4. The method of claim 1, further comprising:
receiving, at the network adapter, a command that attempts to exploit a vulnerability of the network adapter based on the programmable identity; and
processing the command correctly, by the network adapter, wherein subsequent commands are also processed correctly by the network adapter.

5. The method of claim 3, wherein the network adapter is an offload adapter that couples a host to a network, wherein the query is intended to correctly identify the offload protocol stack of the network adapter, wherein the query includes an implicit query, and wherein the response includes an implicit response, wherein the query is designed to be used against a specific protocol stack with a known exploitable error.

6. A network adapter, comprising:
an offload protocol stack; and
a processing element coupled to the offload protocol stack, wherein the network adapter is capable of receiving a query, wherein the processing element is capable of configuring the offload protocol stack to provide a programmable identity for the offload protocol stack by determining that a vulnerability of a first protocol stack emulation of the offload protocol stack has been exposed and by configuring the offload protocol stack to emulate a second protocol stack, in response to determining that the vulnerability of the first protocol stack emulation has been exposed, wherein the offload protocol stack is capable of generating a response to the query by processing the query in the configured offload protocol stack, wherein the response is based on the programmable identity, wherein the programmable identity of the offload protocol stack is capable of being provided by configuring the offload protocol stack to generate the response with an inconsistent signature, and wherein the response is generated with the inconsistent signature by randomly choosing among a plurality of alternative code paths to respond to the query, and wherein the network adapter is capable of sending the generated response, and wherein the programmable identity prevents a correct identification of the offload protocol stack based on an analysis of the sent response to the query.

7. The network adapter of claim 6, wherein the programmable identity of the network adapter is capable of being provided by configuring the offload protocol stack to emulate a plurality of protocol stacks, wherein those protocol stacks that are under cyber attack are less preferred for emulation by the offload protocol stack in comparison to those protocol stacks that are likely to be immune to cyber attacks.

8. The network adapter of claim 7, wherein the programmable identity of the network adapter is capable of being provided by configuring the offload protocol stack to emulate an operating system protocol stack implemented by an operating system in a host to which the network adapter is coupled, wherein the offload protocol stack avoids being vulnerable in situations in which the operating system protocol stack is vulnerable because the offload protocol stock executes code that is different from code executed by the operating system protocol stack.

9. The network adapter of claim 6, wherein the network adapter is capable of
receiving a command that attempts to exploit a vulnerability of the network adapter based on the programmable identity, and wherein the network adapter is capable of processing the command correctly, wherein subsequent commands are also processed correctly by the network adapter.

10. The network adapter of claim 8, wherein the network adapter comprises an offload adapter that couples a host to a network, wherein the query is intended to correctly identify the offload protocol stack of the network adapter, wherein the query includes an implicit query, and wherein the response includes an implicit response wherein the query is designed to be used against a specific protocol stack with a known exploitable error.

11. A system, comprising:
a computational device;
a data storage coupled to the computational device;
a data storage controller to manage Input/Output access to the data storage, wherein the data storage controller is coupled to the computational device;
a network adapter coupled to the computational device; and
an offload protocol stack implemented in the network adapter, wherein the network adapter is capable of receiving a query, wherein the network adapter is capable of configuring the offload protocol stack to provide a programmable identity for the offload protocol stack by determining that a vulnerability of a first protocol stack emulation of the offload protocol stack has been exposed and by configuring the offload protocol stack to emulate a second protocol stack, in response to determining that the vulnerability of the first protocol stack emulation has been exposed, wherein the offload protocol stack is capable of generating a response to the query by processing the query in the configured offload protocol stack, wherein the response is based on the programmable identity, wherein the programmable identity of the offload protocol stack is capable of being provided by configuring the offload protocol stack to generate the response with an inconsistent signature, and wherein the response is generated with the inconsistent signature by randomly choosing among a plurality of alternative code paths to respond to the query, wherein the network adapter is capable of sending the generated response, and wherein the programmable identity prevents a correct identification of the offload protocol stack based on an analysis of the sent response to the query.

12. The system of claim 11, wherein the programmable identity of the network adapter is capable of being provided by configuring the offload protocol stack to emulate a plurality of protocol stacks, wherein those protocol stacks that are under cyber attack are less preferred for emulation by the offload protocol stack in comparison to those protocol stacks that are likely to be immune to cyber attacks.

13. The system of claim 12, wherein the programmable identity of the network adapter is capable of being provided by configuring the offload protocol stack to emulate an operating system protocol stack implemented by an operating system in a host to which the network adapter is coupled, wherein the offload protocol stack avoids being vulnerable in situations in which the operating system protocol stack is vulnerable because the offload protocol stock executes code that is different from code executed by the operating system protocol stack.

14. An article of manufacture, wherein the article of manufacture comprises a storage medium having stored therein instructions that when executed by a machine results in operations, the operations comprising:
   receiving, by a network adapter having an offload protocol stack, a query;
   configuring the offload protocol stack of the network adapter to provide a programmable identity for the offload protocol stack of the network adapter, by:
      (i) determining that a vulnerability of a first protocol stack emulation of the offload protocol stack has been exposed; and
      (ii) configuring the offload protocol stack to emulate a second protocol stack, in response to determining that the vulnerability of the first protocol stack emulation has been exposed;
   generating a response to the query by processing the query in the configured offload protocol stack, wherein the response is based on the programmable identity, wherein the programmable identity of the offload protocol stack is capable of being provided by configuring the offload protocol stack to generate the response with an inconsistent signature, and wherein the response is generated with the inconsistent signature by randomly choosing among a plurality of alternative code paths to respond to the query; and
   sending, by the network adapter, the generated response, wherein the programmable identity prevents a correct identification of the offload protocol stack based on an analysis of the sent response to the query.

15. The article of manufacture of claim 14, wherein the programmable identity of the network adapter is capable of being provided by configuring the offload protocol stack to emulate a plurality of protocol stacks, wherein those protocol stacks that are under cyber attack are less preferred for emulation by the offload protocol stack in comparison to those protocol stacks that are likely to be immune to cyber attacks.

16. The article of manufacture of claim 15, wherein the programmable identity of the network adapter is capable of being provided by configuring the offload protocol stack to emulate an operating system protocol stack implemented by an operating system in a host to which the network adapter is coupled, wherein the offload protocol stack avoids being vulnerable in situations in which the operating system protocol stack is vulnerable because the offload protocol stock executes code that is different from code executed by the operating system protocol stack.

17. The article of manufacture of claim 14, the operations further comprising:
   receiving, at the network adapter, a command that attempts to exploit a vulnerability of the network adapter based on the programmable identity; and
   processing the command correctly, by the network adapter, wherein subsequent commands are also processed correctly by the network adapter.

18. The article of manufacture of claim 16, wherein the network adapter is an offload adapter that couples a host to a network, wherein the query is intended to correctly identify the offload protocol stack of the network adapter, wherein the query includes an implicit query, and wherein the response includes an implicit response, wherein the query is designed to be used against a specific protocol stack with a known exploitable error.

19. The system of claim 13, wherein the network adapter is an offload adapter that couples a host to a network, wherein the query is intended to correctly identify the offload protocol stack of the network adapter, wherein the query includes an implicit query, and wherein the response includes an implicit response, wherein the query is designed to be used against a specific protocol stack with a known exploitable error.

* * * * *

UNITED STATES PATENT AND TRADEMARK OFFICE
CERTIFICATE OF CORRECTION

Page 1 of 1

PATENT NO. : 7,415,513 B2
APPLICATION NO. : 10/741031
DATED : August 19, 2008
INVENTOR(S) : P. L. Connor et al.

It is certified that error appears in the above-identified patent and that said Letters Patent is hereby corrected as shown below:

In the Claims:

Column 10, Line 50, "response wherein" should read --response, wherein--.

Signed and Sealed this
Nineteenth Day of May, 2015

Michelle K. Lee
*Director of the United States Patent and Trademark Office*